United States Patent
Ahrens

[11] 3,939,726
[45] Feb. 24, 1976

[54] INTERLOCKED HAND-AND FOOT-OPERABLE ENGINE SPEED CONTROL

[75] Inventor: Barry Louis Ahrens, Dubuque, Iowa
[73] Assignee: Deere & Company, Moline, Ill.
[22] Filed: Mar. 7, 1974
[21] Appl. No.: 448,910

[52] U.S. Cl. .................................. 74/513; 74/512
[51] Int. Cl.² .......................................... G05G 1/14
[58] Field of Search ............ 74/512, 513, 560, 481, 74/562, 562.5, 482

[56] References Cited
UNITED STATES PATENTS

| | | | |
|---|---|---|---|
| 2,924,117 | 2/1960 | Byrd | 74/513 X |
| 3,002,397 | 10/1961 | Du Shane et al. | 74/482 |

Primary Examiner—Samuel Scott
Assistant Examiner—Frank H. McKenzie, Jr.

[57] ABSTRACT

A manually operable control is provided for effecting acceleration and deceleration of an engine by selective actuation of an engine fuel control device. The control includes an output section comprising first, second and third arms mounted for pivoting about a common axis. A hand throttle linkage is connected directly to the first arm for swinging the latter among selected angular positions and for fixing the first arm in said positions. A foot throttle linkage is connected directly to the second arm, which in turn is connected to the fuel control device. The first and second arms are located on opposite sides of the third arm and have respective abutment portions which extend axially towards the third arm and are disposed so as to respectively be in the paths of movement of a pair of oppositely extending abutment portions of the third arm. A double-coil spring is mounted on the three arms such that, as considered in a first direction of swinging movement of the three arms, a central spring portion located between the two coils engages the trailing side of the third arm while the opposite ends of the spring are respectively engaged with the leading sides of the first and second arms, the respective leading surfaces of the abutment portions of the first and second arms thus being biased into engagement with the respective trailing sides of the oppositely extending abutment portions of the third arm. A desired fuel control device setting can be selected by shifting the hand throttle linkage to and fixing it in a desired position, the torsion spring acting together with the abutment surfaces to transmit the motion of the first arm to the second arm by way of the third arm, the motion of the third arm being transmitted to the fuel control device. The foot throttle linkage floats or moves freely with the third arm when the latter is actuated by the hand throttle linkage. The foot throttle linkage is used to override the fuel control device setting preselected by the hand throttle linkage. For this purpose, the foot throttle linkage includes a two-piece foot pedal having respective toe and heel operable sections pivoted about a common axis for selective operation for respectively initiating acceleration and deceleration of the engine. The toe operable section of the foot pedal can be lifted upwardly by hand to shut off the flow of fuel to the engine. When the foot pedal is released, the torsion spring acts to return the fuel control device to its preselected setting.

5 Claims, 6 Drawing Figures

INTERLOCKED HAND-AND FOOT-OPERABLE ENGINE SPEED CONTROL

BACKGROUND OF THE INVENTION

The present invention relates to a manually operable control for effecting acceleration and deceleration of an engine by selective actuation of an engine fuel control device. More specifically the present invention relates to a foot pedal arrangement for use in a foot throttle linkage of such a control.

Prior art manually operable controls including a hand throttle for selecting a desired engine operating speed and a foot throttle for selectively overriding the hand throttle setting are known in the art. However, they are not entirely satisfactory since no provision is made for preventing the operator from accidentally shutting off the engine by operating the foot throttle.

SUMMARY OF THE INVENTION

According to the present invention, there is provided a novel control linkage for controlling the acceleration and deceleration of a vehicle engine and more specifically there is provided a novel foot pedal arrangement for use in a foot throttle linkage section of such a control.

It is a broad object of the invention to provide a foot pedal arrangement constructed of first and second separate sections which are respectively operable for effecting acceleration and deceleration during normal operation of an engine.

A more specific object is to provide a foot pedal arrangement, as set forth in the preceding paragraph, wherein the first pedal section may be selectively overtravelled in a direction opposite to that for causing engine acceleration to effect an engine shut off condition.

BRIEF DESCRIPTION OF THE DRAWINGS

FIG. 6 is an exploded, perspective view of a two-piece foot pedal arrangement forming part of the foot throttle linkage for effecting acceleration and deceleration of the vehicle engine from a speed selected by the hand throttle linkage.

DESCRIPTION OF THE PREFERRED EMBODIMENT

Figure 1:
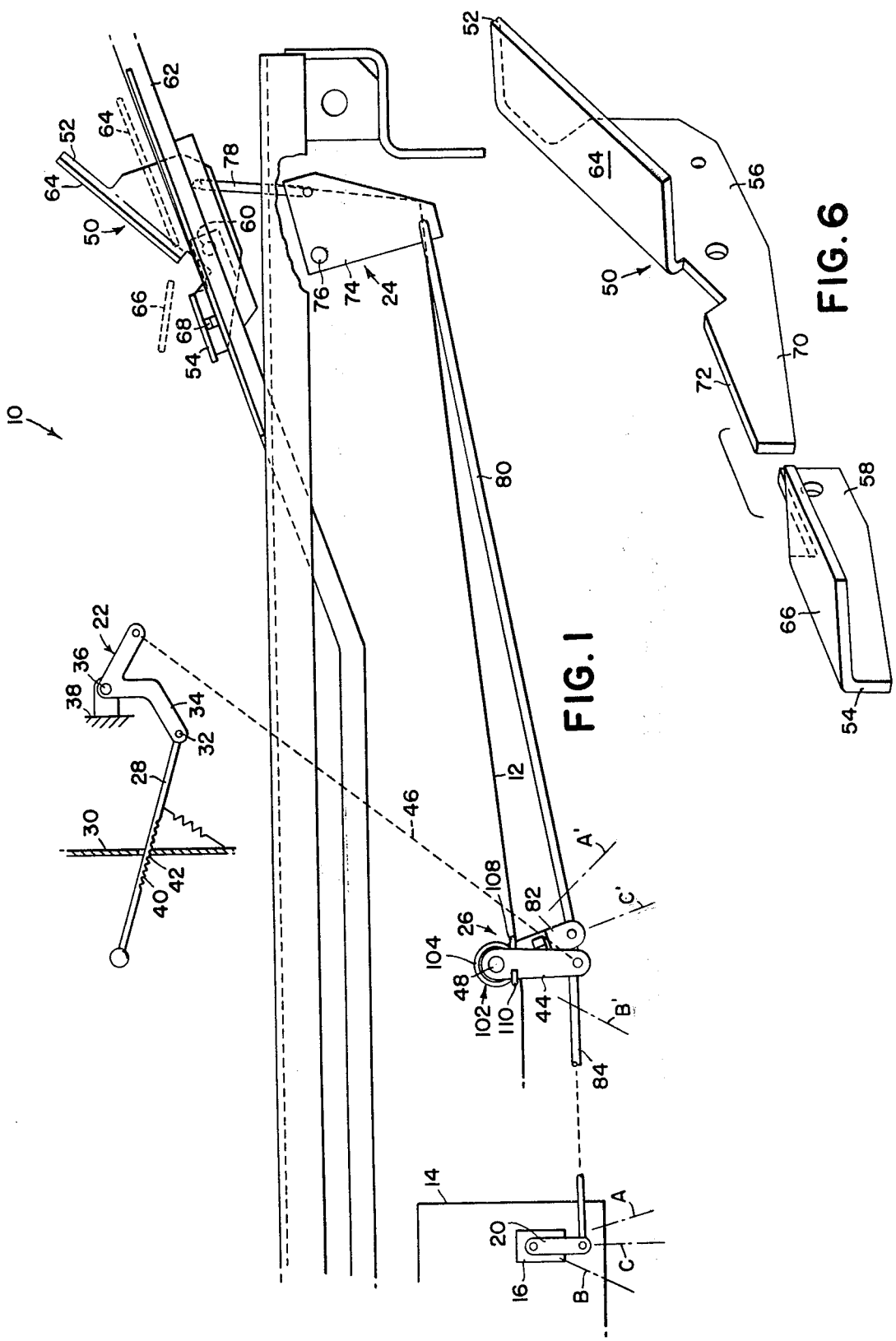
FIG. 1 shows, in a partially schematic right side elevational view, the upper midportion of an engine-powered vehicle embodying the present invention.
Figure 2:
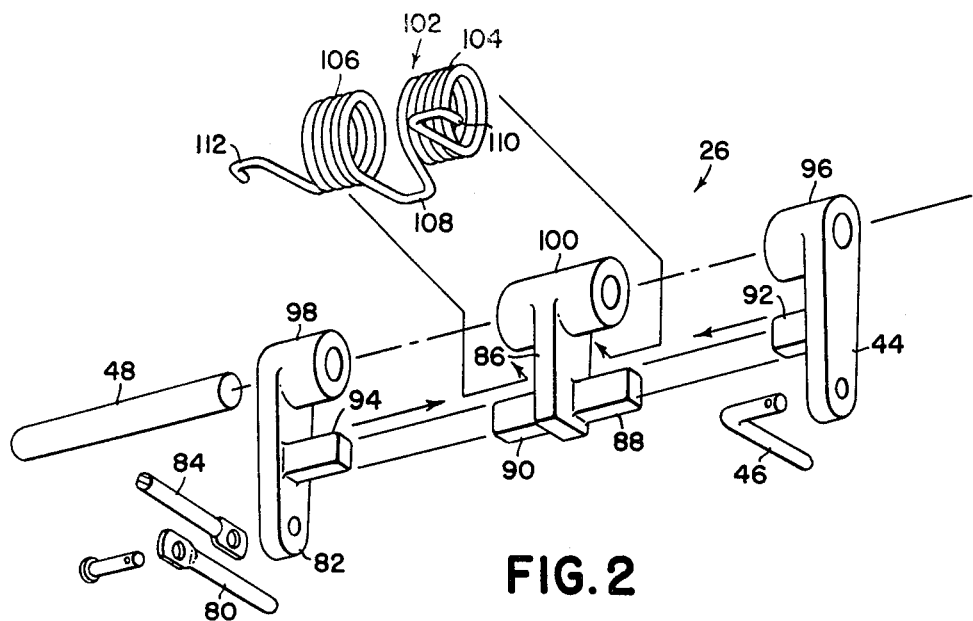
FIG. 2 is an exploded, isometric view of the output section of the control linkage.

Referring now to the drawings, a vehicle is partially illustrated in FIG. 1 and indicated there in its entirety by the reference numeral 10. While it is to be understood that the present invention may be applied to vehicles of various configurations, the vehicle illustrated here is of a type including a longitudinal frame 12 on which an engine, shown schematically at 14, is mounted rearwardly of an operator's station of the vehicle. Associated with the engine for controlling the flow of fuel thereto is a fuel control device, shown schematically at 16, which may be a fuel pump or a carburetor. The fuel control device 16 includes a control arm 20 which is pivotally mounted for swinging movement between an engine shutoff position, indicated by the line at A, for effecting total shutoff of fuel to the engine, and a high idle position, indicated at the line B for effecting maximum flow of fuel to the engine. The control arm 20 is here shown in a low idle position indicated by the line at C. Except when the engine is to be stopped, the control arm will normally work in a range between the high idle position B and the low idle position indicated by the line at C.

For the purpose of controlling the movement of the control arm 20 of the fuel control device 16, there is provided a manually operable control linkage comprising a hand throttle input linkage section 22 and a foot throttle input linkage section 24 which are connected to an output linkage section 26.

The hand throttle input linkage section 22 may be of any variety of conventional constructions and is here illustrated schematically as including a generally fore-and-aft extending control rod 28 projecting through an opening in a control console housing 30 and having its forward end pivotally connected as at 32, to one arm of a bell crank 34 which is pivotally connected, as at 36, to a control console support 38. The control rod 28 is shiftable fore and aft in the opening in the housing 30 to effect movement of the fuel control device in a manner to be described below. The control rod 28 is held in a preselected position through means of interengagement of one of a plurality of teeth 40, formed on the underside of the rod, with a tang or projection 42 formed on the lower peripheral portion of the opening in the housing 30 through which the control rod projects. It will be appreciated that fore-and-aft movement of the control rod 28 will cause the bell crank 34 to be swung about its pivotal connection 36. Interconnecting the bell crank with the lower end of a first arm 44 of the output linkage section 26 is a linkage, which may be any suitable configuration and is indicated here by the dashed line 46. The arm 44 is pivotally connected to the frame 12 by a horizontal, transverse pin 48.

The foot throttle input linkage section 24 includes a foot pedal arrangement 50 comprising front and rear angular foot pedal sections 52 and 54, respectively, having respective vertical legs 56 and 58 pivotally connected as at 60 to a member 62 forming part of the floor of the operator's station. Integral with the upper forward portion of the leg 56 of the front foot pedal section 52 is a laterally extending toe engageable flange or leg 64 which is forwardly and upwardly inclined. Integral with the upper rear portion of the vertical leg 58 of the rear foot pedal section 54 is a laterally extending heel-engageable flange or leg 66. Fixed to the frame member 62 to limit the rotation of the rear pedal section 54 is a stop 68. For the purpose of moving the rear pedal section 54 clockwise concurrently with clockwise pivotal movement of the front foot pedal section 52, the vertical leg 56 of the pedal section 52 is provided with a rear portion 70 which is disposed alongside the vertical leg 58 of the rear pedal section 54 and has an upper edge 72 disposed in engagement with the heel-engageable flange or leg 66. Positioned below the foot pedal arrangement is a bell crank 74 which is generally triangular in side view and which is pivotally connected to the frame 12, at a location approximately vertically below the pivotal connection 60, through means of a transverse horizontal pivot pin 76 located adjacent a rearward upper corner of the bell crank 74. The bell crank 74 includes a forward upper corner disposed forwardly of the pivot pin 76 and pivotally linked to a forward lower portion of the vertical leg 56 of the front foot pedal section 52 through means of a link 78. The bell crank 74 further includes a lower corner to which one end of a link 80 is pivotally connected, the other end of the link 80 being pivotally connected to the lower end of a second arm 82 forming part of the output linkage section 26 and mounted for vertical swinging movement about the pivot pin 48. A further link 84 has its opposite ends respectively pivotally connected to the second arm 82 and the control arm 20 of the fuel control device 16.

Figure 3:
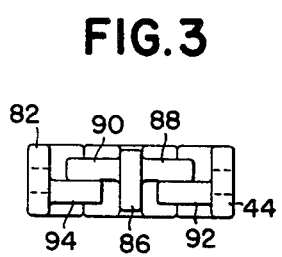
FIG. 3 is a bottom view of the output section of the control linkage with the respective arms thereof being shown in the respective typical positions they occupy when the first arm is in a preselected position corresponding to a desired setting of the fuel control device.

Besides the first and second arms 44 and 82, the output linkage section 26 includes a thrid arm 86 pivotally mounted for swinging movement about the pivot pin 48. The third arm 86 is mounted between the first and second arms 44 and 82 and includes stop projections or abutments 88 and 90, respectively, projecting in opposite axial directions towards the first and second arms. The first arm in turn includes a stop projection or abutment 92 which projects towards the third arm and is located for engagement by the stop projection 88 thereof while the second arm 82 includes a stop projection or abutment 94 which projects towards the third arm and is disposed for engagement with the stop projection 90 thereof. The first, second and third arms 44, 82 and 86, respectively, have inner cylindrical ends 96, 98 and 100 which are coaxially received on the pivot pin 48. For the purpose of resiliently interconnecting the three arms together, there is provided a double-wound, helically coiled torsion spring 102 comprising first and second coil sections 104 and 106, respectively, formed integrally with an intermediate generally U-shaped section 108 extending to the inner ends of the coils, the coils 104 and 106 respectively having opposite ends of the spring extending tangentically thereto in a direction opposite from that of the intermediate section 108 and being bent into respective hooks 110 and 112 which open in a direction opposite to that in which the U-shaped intermediate section 108 opens. When the spring 102 is installed, the first coil section 104 is received partly on each of the cylindrical inner ends 96 and 100 respectively of the first and third arms while the second coil section 106 is partly received on each of the cylindrical inner ends 98 and 100 respectively of the second and third arms. The intermediate section 108 then engages a leading side of the third arm as considered moving in the counterclockwise direction in FIG. 1 while the hooks 110 and 112 respectively engage the trailing sides of the first and second arms 44 and 82, respectively. The coil spring 102 is normally under a preset torsional load when the arms are aligned axially with each other as shown in FIG. 3, which is typical of the relative positions the arms will bear to each other when they are in a position as set by the hand throttle input linkage section 22. It will be appreciated then that the windup of the first and second coil sections 104 and 106 will act to urge the third arm 86 clockwise, as viewed in FIG. 1, while at the same time acting to urge the first and second arms 44 and 82 counterclockwise to thereby yieldably maintain the stop projection 88 and 90 of the third arm respectively in engagement with the stop projections 92 and 94 respectively of the first and second arms 44 and 82.

Figure 4:
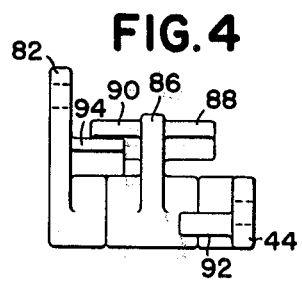
FIG. 4 is a view similar to FIG. 3 but showing the arms in relative positions they occupy when the second arm is swung in a first direction from that shown in FIG. 3 to effect a deceleration of the vehicle engine by moving the fuel control device in a first direction from that set by the first arm.
Figure 5:
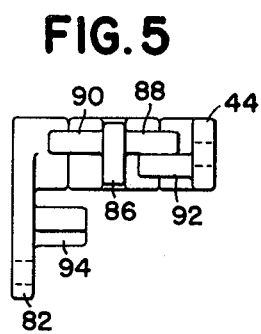
FIG. 5 is a view similar to FIG. 3 but showing the third arm swung in a second direction from that illustrated in FIG. 3 for effecting an acceleration of the vehicle engine by moving the fuel control device in a second direction from that set by the first arm.

As shown in FIG. 1, the first arm 44 is in an intermediate position between low and fast idle positions respectively indicated by the lines $B^1$ and $C^1$, the position being controlled by and corresponding to an intermediate position of the hand throttle rod 28, as shown in FIG. 1. A shutoff position is indicated by the line $A^1$, the positions $A^1$, $B^1$ and $C^1$ corresponding to the positions A, B and C of the fuel control device arm 20. This intermediate position of the arm 44 is shown in each of the FIGS. 3, 4 and 5. In FIG. 3, the positions of the second and third arms are as they normally would be when under only the influence of the hand throttle input linkage 22. In FIG. 4, the second and third arms are in respective high idle positions to which they would be moved by depressing the front foot pedal section 52 to the dashed line position shown in FIG. 1 and, in FIG. 5, the second and third arms are in respective low idle positions, corresponding to FIG. 1, to which they are moved by depressing the rear foot pedal section 54 against the stop 68 as shown in full lines in FIG. 1.

It is important to note that the linkage of the foot throttle input linkage section 24 float or move freely with the movement of the second arm as effected through actuation of the hand throttle input linkage section 22, and that the linkages of the hand throttle input linkage section 22 are fixed in place through the coaction of the tang projection 42 of the housing 30 and the teeth 40 on the rod 28.

The operation of the control linkage for controlling the acceleration and deceleration of the engine speed through means of controlling the fuel control device 16 is as follows. Assuming that an operator wishes to set the engine speed at an intermediate idling speed, he will move the hand operable control rod 28 to an intermediate position as shown in FIG. 1. Movement of the control rod to this position will be transferred to the first arm 44 of the output linkage section 26, through the linkage indicated at 46, and from there to the third and second arms 86 and 82 and then to the fuel control device 16 by means of the link 84. In the case when the first arm 44 is swung towards the third arm 86, motion of the first arm is transferred directly to the third arm through means of the interengaged stop projections 88 and 92, the spring 102 then acting to transfer this movement to the second arm 82. In the case where the first arm 44 is swung away from the third arm 86, the spring 102 acts to cause the third arm 86 to move concurrently with the first arm and the second arm 82 is moved concurrently with the first and third arms through means of the interengagement of the stop projections 90 and 94, respectively. Thus, when the hand throttle input linkage section 22 is actuated to control the fuel control device 16, the first, second and third arms will move in unison and will occupy positions relative to each other such as that shown in FIG. 3.

Also, due to the fact that the foot pedal arrangement 50 is free to float with movement of the second arm 82, the front foot pedal section 52 will be rotated clockwise from the position illustrated in FIG. 1 when the second arm 82 is in a position corresponding to an intermediate idle condition of the engine. Due to the engagement of the upper edge 72 of the front foot pedal section 52 with the underside of the heel-engageable flange 66 of the rear foot pedal section 54 the latter will also be rotated clockwise from the position illustrated.

Then, if it is desired to momentarily decelerate the engine from the condition selected by the control rod 28 of the hand throttle input linkage section 22, it is necessary only for the operator to put his heel on the flange 66 of the rear foot pedal section 54 and exert a force to depress the pedal section 54. Downward movement of the rear pedal section 54 will be transferred directly to the front foot pedal section 52 and the movement of the latter will be transferred to the fuel control device arm 20 through means of the link 78, the bell crank 74, the link 80, the second arm 82 and the link 84. The second arm 82 will thus be caused to move towards the third arm 86, causing the latter to be moved concurrently therewith by virtue of the interengagement of the stop projections 90 and 94, the spring 102 becoming torsionally loaded by virtue of the fact that one end is engaged with the first arm 44 and the first arm is fixed in position while the remainder of the spring moves with the second and third arms. Thus, when the operator desires to return the operating speed of the vehicle engine to that preselected by the hand throttle, he need only to remove his foot from the rear foot pedal section 54 and the spring 102 will act to return the second and third arms to their respective starting positions which in turn will result in the control arm 20 of the fuel control device 16 being returned to its starting position. It is to be noted that the stop 68 will engage the underside of the flange 66 of the rear foot pedal section 54, as shown in FIG. 1, to prevent the engine from being decelerated beyond a low idle condition by operation of the rear pedal section 54. Should the operator desire to shut the engine off through operation of the foot pedal arrangement 50, he may do so by pulling upwardly on the front end of the front foot pedal 52 to overtravel the section in the counterclockwise direction from the position thereof shown in FIG. 1. This latter operation may be especially accomodating to an operator who has dismounted from the vehicle and wishes to shut the engine of the vehicle off without again remounting the vehicle, since the operator need only to reach the front foot pedal 52 to accomplish the operation.

Acceleration of the vehicle engine from a condition preselected by the hand throttle may be accomplished by engaging and depressing the front foot pedal section 52 to rotate the latter in the clockwise direction as viewed in FIG. 1. This movement of the pedal section 52 will be transferred to the second arm 82 by means of the link 78, the bell crank 74 and the link 80 so as to cause the second arm to be moved in a direction away from the third arm 86. Since the third arm 86 has its stop projection 88 engaged with the stop projection 92 of the first arm, the first arm prevents movement of the third arm and the spring 102 will be loaded. Thus, when it is desired to again operate the engine at the condition preset by the hand throttle, the operator need only to remove his foot from the front foot pedal section 52 and the spring 102 will act to again return the second arm 82 and the control arm of the fuel control device 16 to their starting positions.

I claim:

1. A foot pedal arrangement for actuating an engine fuel control device so as to selectively effect acceleration or deceleration of an internal combustion engine, comprising: first and second separate pedal sections pivotally mounted for independent swinging in opposite first and second directions about a fixed pivot axis; a control linkage means interconnecting said first pedal section with said fuel control device for respectively affecting increases and decreases in fuel flow and respective attendant acceleration and deceleration of engine speed when the first pedal section is respectively moved in said first and second directions; and said first and second pedal sections including one-way connecting means for effecting movement of said second section in said first direction in response to and concurrently with movement of said first section in said first direction and for effecting movement of said first section in said second direction in response to and concurrently with movement of said second section in said second direction.

2. The pedal arrangement defined in claim 1 wherein a stop is positioned for engagement by said second pedal section to limit the movement of the latter in said second direction so as to prevent actuation of the fuel control device to a position for shutting off the flow of fuel to an engine, whereby the pedal arrangement may be used to shut off fuel flow to an engine only by moving the first pedal section in said second direction an angular amount greater than that achievable by moving said second pedal section.

3. The pedal arrangement defined in claim 1 wherein said first pedal section includes a first upwardly facing surface located substantially entirely on one side of said axis and adapted for engagement by that portion of an operator's foot located forwardly of his heel; and said second pedal section including a second upwardly facing surface located on the side of said axis opposite from said first upwardly facing surface and adapted for engagement by the heel portion of an operator's foot.

4. The pedal arrangement defined in claim 3 wherein said first and second pedal sections each comprise an angled plate having an upright portion mounted for movement about said axis and having a top portion angled sideways to said upright portion; the respective top portions of said first and second pedal sections respectively defining said first and second upwardly facing surfaces.

5. The pedal arrangement defined in claim 4 wherein said one-way connection means includes respective abutting surfaces located on the underside of the top portion of said second pedal section and at the top of a portion of the first pedal section extending beneath said top portion of said second pedal section.

* * * * *